United States Patent
McDowell et al.

(10) Patent No.: US 6,244,902 B1
(45) Date of Patent: Jun. 12, 2001

(54) SMART CARD READER FOR ELEVATED PLACEMENT RELATIVE TO A PRINTED CIRCUIT BOARD

(75) Inventors: Jennifer L. McDowell; Ronald W. McDowell, both of Cordova, TN (US); Douglas L. Meister, Loganville, GA (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/566,281

(22) Filed: May 5, 2000

Related U.S. Application Data (60) Provisional application No. 60/132,534, filed on May 5, 1999.

(51) Int. Cl.⁷ ................................................. H01R 23/70
(52) U.S. Cl. .......................................... 439/630; 437/631
(58) Field of Search ..................................... 439/188, 325, 439/488, 489, 630, 631, 376

(56) References Cited

U.S. PATENT DOCUMENTS

| | | |
|---|---|---|
| 4,548,452 | 10/1985 | Gillett . |
| 4,780,603 | 10/1988 | Hamada . |
| 4,806,103 | 2/1989 | Kniese et al. . |
| 4,874,323 * | 10/1989 | Shibano ............................... 439/260 |
| 4,900,272 | 2/1990 | Lange et al. . |
| 4,900,273 | 2/1990 | Pernet . |
| 4,932,885 | 6/1990 | Scholz . |
| 5,269,707 | 12/1993 | Reichardt et al. . |
| 5,667,397 | 9/1997 | Broschard, III et al. . |
| 5,674,080 | 10/1997 | Takemura . |
| 5,775,929 | 7/1998 | Hashiguchi . |
| 5,775,937 | 7/1998 | Brichaud et al. . |
| 5,848,920 | 12/1998 | Klein et al. . |
| 5,901,049 | 5/1999 | Schmidt et al. . |
| 6,039,599 * | 3/2000 | Benjamin et al. ................... 439/489 |

* cited by examiner

Primary Examiner—Brian Sircus
Assistant Examiner—Thanh-Tam Le
(74) Attorney, Agent, or Firm—Hoffmann & Baron, LLP (57) ABSTRACT

The present invention provides an electrical connector for connecting a contact pad of an IC card to a printed circuit board. In particular, a smart card connector is provided which elevates the connector above the PCB for placement of additional components therebeneath. The connector includes a housing having a top component and a bottom component affixed thereto wherein the top and bottom components together define a card insertion ingress at a front portion of the connector. The ingress is sized and shaped to accommodate linear sliding insertion of a smart card therein along a card insertion plane defined between the top and bottom portions. The top portion of the connector supports a plurality of electrical contacts therein wherein each contact includes an inner extent having a spring-like undulation at a freely deflectable extent positioned in the card insertion plane. Upon card insertion, a contact pad on the card engages the freely deflectable extent such that the undulation moves upward into a corresponding indentation defined along a bottom surface of the top portion of he connector. Upon retraction of the card, the undulation resiliently returns to its original position in the card insertion plane. Each contact further includes an outer extent that protrudes normally from the top portion of the connector for termination to the PCB. The contacts are desirably distributed in even and aligned rows that enable placement of all contacts in the top portion of the connector.

14 Claims, 6 Drawing Sheets

SMART CARD READER FOR ELEVATED PLACEMENT RELATIVE TO A PRINTED CIRCUIT BOARD

This application claims the benefit of U.S. Provisional Application No. 60/132,534, filed on May 5, 1999.

FIELD OF THE INVENTION

The present invention relates generally to an apparatus that electrically connects an integrated circuit (IC) card to a printed circuit board (PCB). More particularly, the present invention is directed to a smart card connector affixed at an elevation to a PCB wherein the connector supports a plurality of contacts in a top portion thereof. In this configuration, the connector not only preserves valuable PCB space for placement of additional components therebeneath but also obviates the requirement for an intermediate connector portion for support of electrical contacts thereinside.

BACKGROUND OF THE INVENTION

In correlation with an increasing demand for diminutive electronic devices capable of multipurpose performance, the electronic industry has seen growth in the use of flat plastic cards incorporating computer chips therein. These chip or IC cards are also commonly referred to as "smart cards" and incorporate at least one electronic component to which electrical connection must be made. Smart cards, which often have compact size and shape corresponding to conventional credit and money-access cards, also include at least one contact pad defined on a surface thereof that establishes electrical connection to the electronic components of a printed circuit board (PCB). Smart cards are particularly adapted for use in industries requiring strict billing control and convenient access to money and information. Such applications include public phones, vending machines, copy machines, laundromat machines and portable devices such as mobile phones, pagers, laptop computers and similar electronic devices. Such cards can also be used in applications relating to health services, ticketing, security access and machine controls. In this disclosure, the terms "IC card", "chip card" and "smart card" will be used interchangeably to denote integrated circuit cards of this type.

In order to effect electrical connection between a smart card and a PCB, an electrical connector or smart card reader is employed such that the connector securably accommodates the smart card therein. The connector serves as an interface between a smart card and a reading system that interprets the information contained in the card.

The art has utilized numerous electrical connectors specifically designed for use in removably connecting various types of smart cards. An illustrative example of a conventional smart card reader is provided in FIG. 1, wherein a smart card connector 10 includes a housing 12 fabricated from an insulative plastic and having a top portion 12a and a bottom portion 12b having dimensions circumscribed by a peripheral side wall 12c. Top portion 12a and bottom portion 12b together define a linear card insertion slot 14 having ingress 14a through which a smart card enters connector 10. Ingress 14a is generally sized and shaped to correspond to a smart card that is inserted therethrough.

Figure 1:
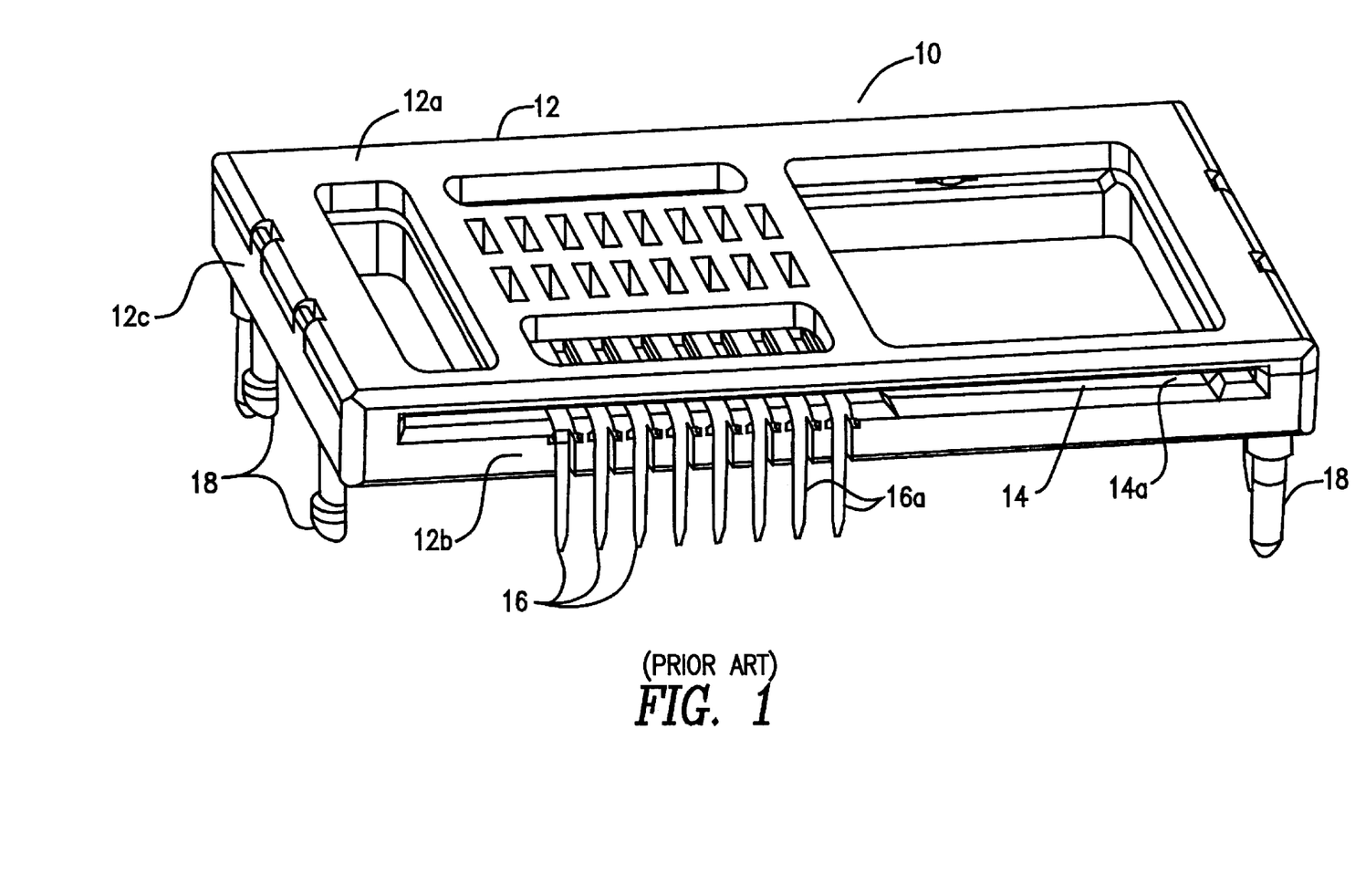
FIG. 1 is a front perspective view of a smart card connector of the prior art having a plurality of electrical contacts supported in a bottom portion of the connector housing.

Bottom portion 12b supports a plurality of electrical contacts 16 for electrical engagement with a contact pad of a smart card inserted thereagainst. Contacts 16 lie outwardly from a mid-section of bottom portion 12b and have tail portions 16a that extend normally relative to peripheral wall 12c. Bottom portion 12b further includes one or more securement members 18 protruding from a bottom surface thereof for alignment and securement of connector 10 with a PCB. In order to ensure sufficient termination of contacts 16 to the PCB, bottom portion 12b is positioned flush therewith.

Although the aforedescribed connector effectively establishes electrical contact between a smart card and a PCB, its use may not be desirable in configurations where conservation of materials and space is essential. The above design requires at least two housing portions wherein one portion must provide enough space for support of a requisite number of electrical contacts therein. Such configuration minimizes the amount of open space between the connector and the PCB, thereby sacrificing the ability to place additional components therebeneath. This configuration further limits the selection of card orientation during insertion thereof into the connector. Such limitations inhibit the use of the device within crowded PCB configurations, thereby contributing to increased costs associated with the manufacture of such reading devices.

Thus, it is desirable to provide a smart card connector that establishes electrical communication between a smart card and a PCB while optimizing the available PCB space for placement of multiple components thereon. It is further desirable to provide a smart card connector that implements a contact configuration so as to effect a satisfactory electrical connection and enable visualization of a proper card insertion orientation.

SUMMARY OF THE INVENTION

It is an object of the present invention to provide a smart card connector for insertable accommodation of a smart card therein.

It is a further object of the present invention to provide a smart card connector that supports a smart card for movement into mechanical and electrical communication with contacts supported by the connector.

It is another object of the present invention to provide a smart card connector that optimizes available PCB space by enabling placement of additional components beneath the connector.

It is yet another object of the present invention to provide a smart card connector that enables a card reading operation to commence from a top portion of the connector wherein all electrical contacts are supported from a common termination side.

It is still another object of the present invention to enable visualization of the proper orientation of a smart card prior to insertion of the card into the connector.

In the efficient attainment of these and other objects, the present invention provides an electrical connector for connecting a contact pad of an IC card to a printed circuit board. The present invention is based on the problem of creating a reader for chip cards in which available PCB real estate is minimized by placing a card reading device directly adjacent a PCB. The present invention is also directed to the related problem of electrical apparatus packaging, wherein it is desirable to optimize use of available space to accommodate more functions, and thereby more components, in the apparatus. The present invention addresses the need to increase the available packaging space in the device to accommodate improvements thereof.

By means of the present invention, a reader for smart cards is provided for connecting one or more contact pads of an IC card to the conductive elements of a PCB. In particular, a smart card connector is provided which elevates the connector above the PCB for placement of additional components therebeneath. The smart card connector of the present invention includes a housing having a lid and a base affixed thereto wherein the lid and base together define a card insertion ingress at a front portion of the connector. The ingress is sized and shaped to accommodate linear sliding insertion of a smart card along a card insertion plane defined along a card insertion slot that is circumscribed by the lid and base.

The connector lid supports a plurality of electrical contacts therein wherein each contact includes an inner extent having a spring-like undulation at a freely deflectable interior extent positioned in the card insertion plane. Upon card insertion, at least one contact pad on the card engages the interior extent such that the undulation deflects into a corresponding recess defined within the connector lid. Upon retraction of the card from the connector, the undulation resiliently returns to its original position in the card insertion plane. Each contact further includes an outer extent that protrudes normally from the connector lid for termination to the PCB. The contacts are desirably distributed in even and aligned rows that enable placement of all contacts in the connector lid.

DETAILED DESCRIPTION OF THE PREFERRED EMBODIMENTS

The present invention provides for an integrated chip (IC) card connector that establishes an electrical connection between at least one contact pad on the card and corresponding conductive elements of a printed circuit board (PCB). The connector requires a housing fabricated from an insulative plastic. The housing includes a lid and a base that together define a card insertion plane therebetween having a card insertion ingress at a front boundary thereof. The connector lid supports a plurality of electrical contacts in even, aligned distribution therein so as to effect electrical engagement between the contacts and at least one contact pad on the card. In addition, at least one offset protrudes from a bottom surface of the connector base. The offset includes a securement element extending therefrom for attachment to the PCB or other support surface for the connector. The offset elevates the connector above the PCB by a height equal to the height of the offset, generating additional PCB space covering an area equal to the area of the bottom surface.

Now referring to FIGS. 2–5B, wherein like elements are identically numbered, the smart card connector of the present invention can now be described.

Figure 2:
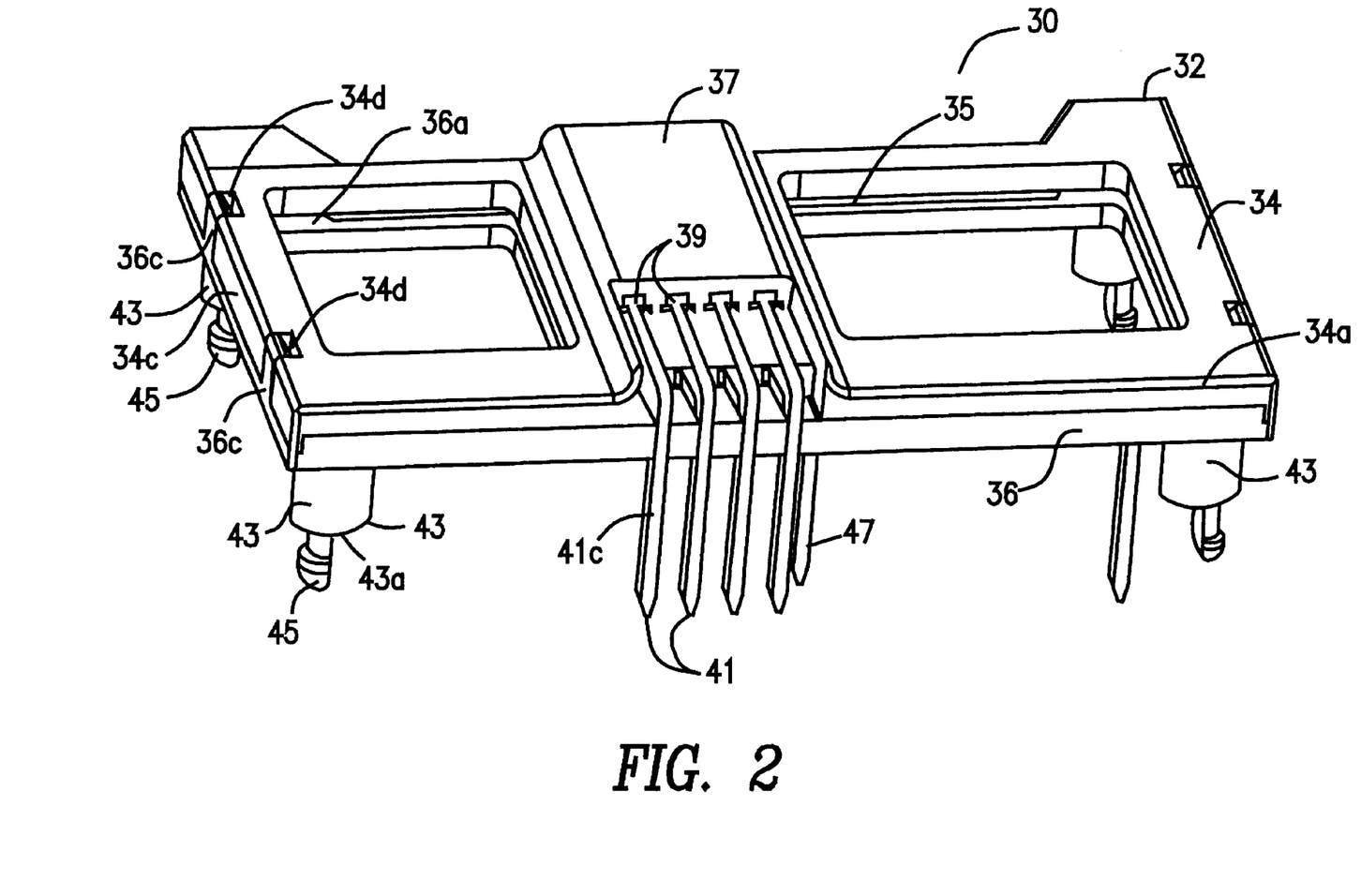
FIG. 2 is a rear perspective view of a smart card connector of the present invention.
Figure 2A:
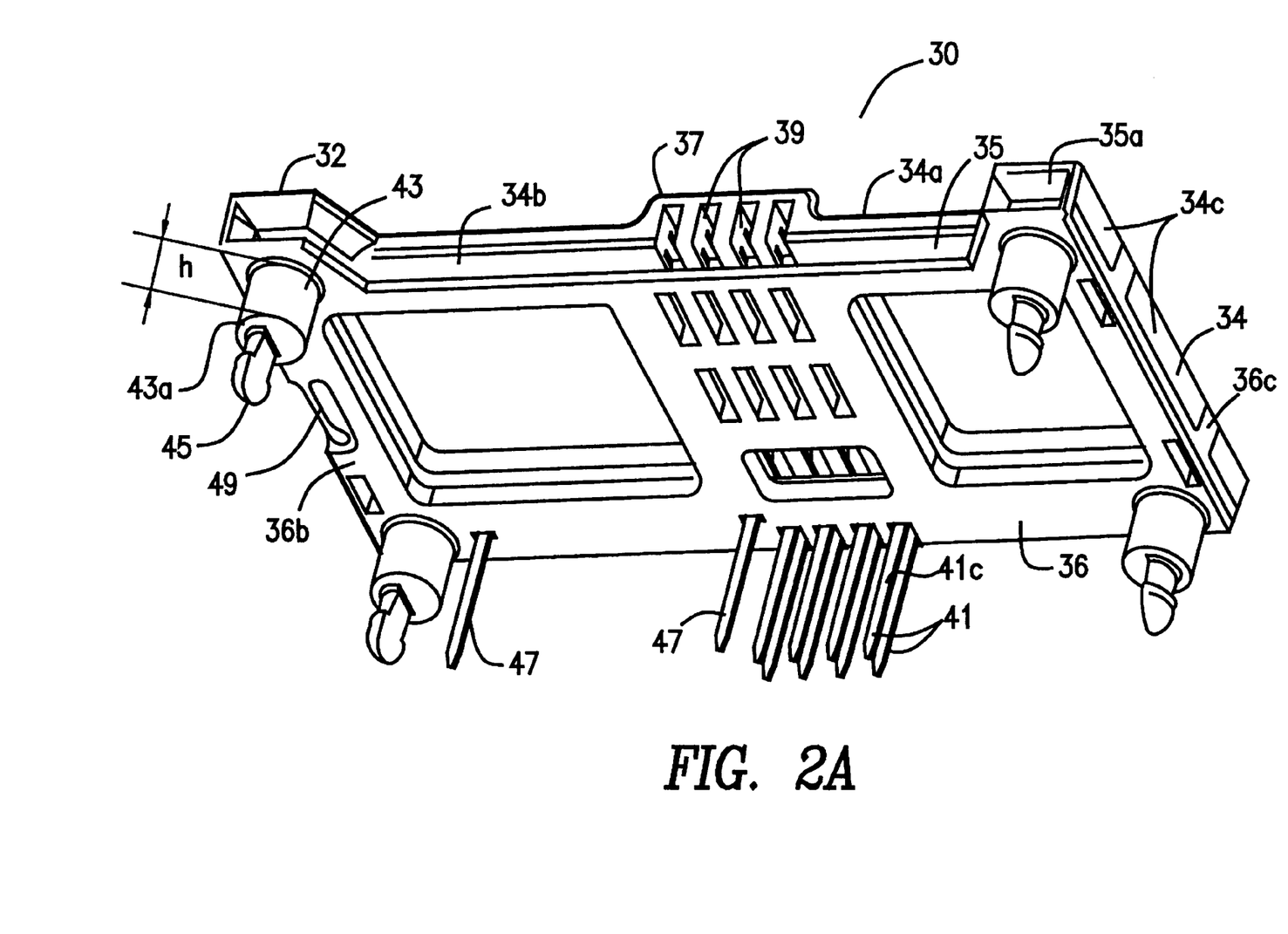
FIG. 2A is a front perspective view of the smart card connector of FIG. 2.

A smart card connector 30 of the present invention is provided in FIGS. 2 and 2A. Connector 30 includes a housing 32 having each of a connector lid 34 and a connector base 36, each being molded from an insulative plastic. Lid 34 and base 36 together define a card insertion slot 35 therebetween wherein a smart card is linearly inserted along a card insertion plane. A card insertion ingress 35a bounds a frontmost portion of slot 35 and is sized and shaped to accept a correspondingly configured smart card therewithin.

Lid 34 is defined by a substantially planar upper surface 34a opposed by a substantially planar bottom surface 34b having side wall portions 34c depending therefrom. Upper surface 34a is bifurcated by a contact hangar 37 having sufficient thickness to define a plurality of longitudinal recesses 39 therein. Recesses 39 correspond to a plurality of electrical contacts 41 supported in lid 34 in aligned even distribution to effect proper mechanical and electrical engagement with all contact pads of a smart card.

Each contact 41 includes an interior contact extent 41a (shown in FIG. 5A) having a freely deflectable spring-like undulation 41b defined thereat for electrical engagement with the contact pad of a smart card inserted thereagainst. Each contact 41 further includes an exterior contact extent 41c for termination to the PCB. Each recess 39 accommodates deflection of a corresponding undulation 41b upon insertion of a smart card in slot 35. The configuration and operation of contacts 41 is further described hereinbelow.

Connector base 36 is defined similarly to connector lid 34 in that it has a substantially planar upper surface 36a opposed by a substantially planar bottom surface 36b. Side latches 36c depend normally from upper surface 36a and interengage corresponding receptacles 34d in lid 34. The internengagement of lid 34 and base 36 as illustrated herein is merely an example of one type of configuration that can be implemented to secure lid 34 and base 36 to one another. It is therefore understood that other types of retention members can be employed without departing from the scope of the invention.

Base 36 further includes a plurality of offsets 43 protruding normally from bottom surface 36b toward a PCB (not shown) to which connector 30 is attached. Each offset 43 has a height h corresponding to a desired height at which connector 30 is elevated above the PCB. An offset 43 includes a substantially planar surface landing 43a at an extremity thereof from which an elongate securement member 45 extends. Securement members 45 are insertably affixed within a mounting aperture (not shown) in the PCB such that landing 43a lies flush thereagainst to define a component placement area beneath connector 30, such area having height h. Such height h is of sufficient dimension so that connected board mounted components (not shown) may be mounted to the board beneath connector 30.

Base 36 can also include one or more conventional switching contacts 47 to indicate complete insertion of a smart card within connector 30 and further initiate a card reading operation. Such switching contacts are well known within the art to execute a card reading operation and to control movement of a smart card during sliding insertion thereof in the connector. Base 36 may additionally include one or more retention fingers 49 formed integrally therewith. Finger 49 presses against an edge of a smart card to ensure alignment of the card along the card insertion plane and further ensure securement of the card in the connector once the card is in a fully inserted card reading position.

Now referring to FIGS. 3 to 5B, a preferred embodiment of the present invention can now be described.

Figure 3:
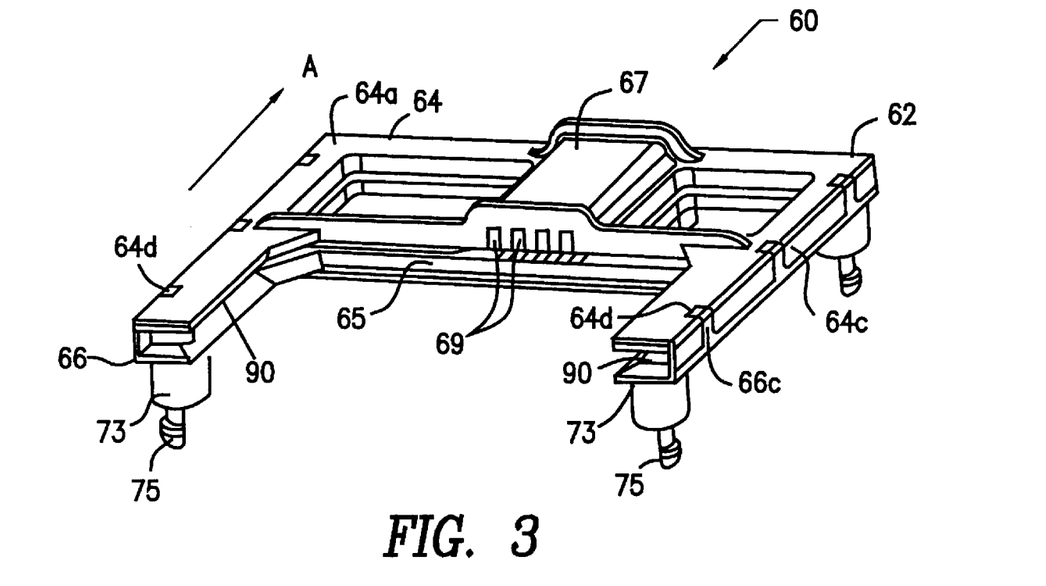
FIG. 3 is a front perspective view of a preferred embodiment of the smart card connector of the present invention.
Figure 3A:
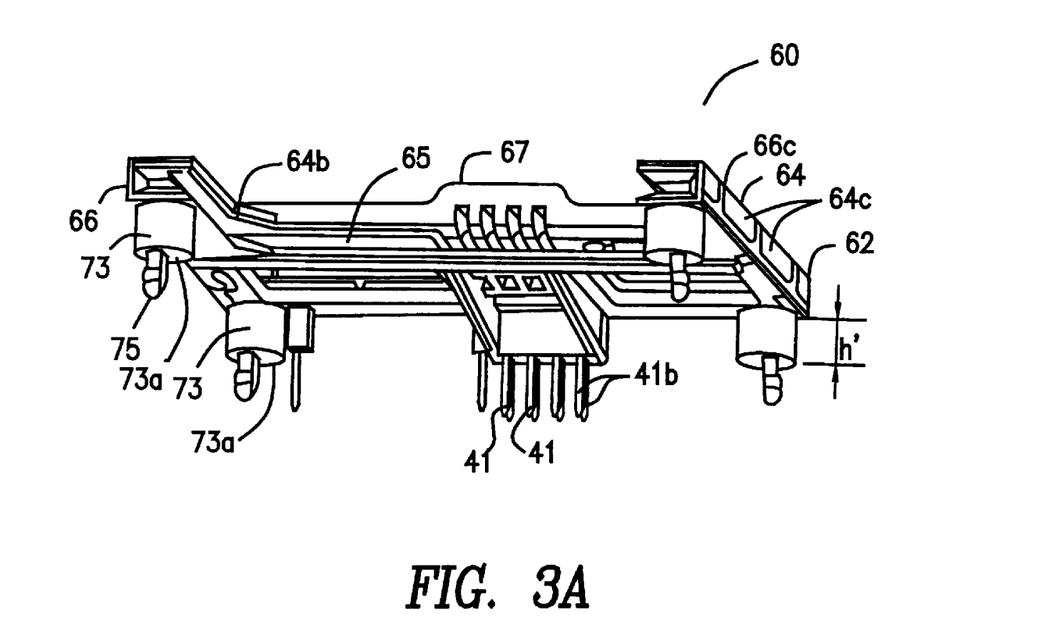
FIG. 3A is an alternate front perspective view of the smart card connector of FIG. 3.

FIGS. 3 and 3A show alternate front perspective views of a smart card connector 60 of the present invention. Connector 60 includes a housing 62 fabricated from an insulative plastic material. Housing 62 includes each of a lid 64 and a base 66 interengaged with one another via securement of latches 66c with corresponding receptacles 64d. The configuration of lid 64 and base 66, respectively, is similar to that of lid 34 and base 66, respectively, of connector 30 shown in FIGS. 2 and 2A. Lid 64 is formed as a generally planar surface having opposed upper and lower planar surfaces 64a and 64b, respectively, which is bifurcated by a contact hangar 67. In addition, side wall portions 64c depend downward on lid 64 to create a wall that, together with latches 66c, circumscribes a card insertion slot 65 for sliding receipt of a smart card therein.

Figure 4:
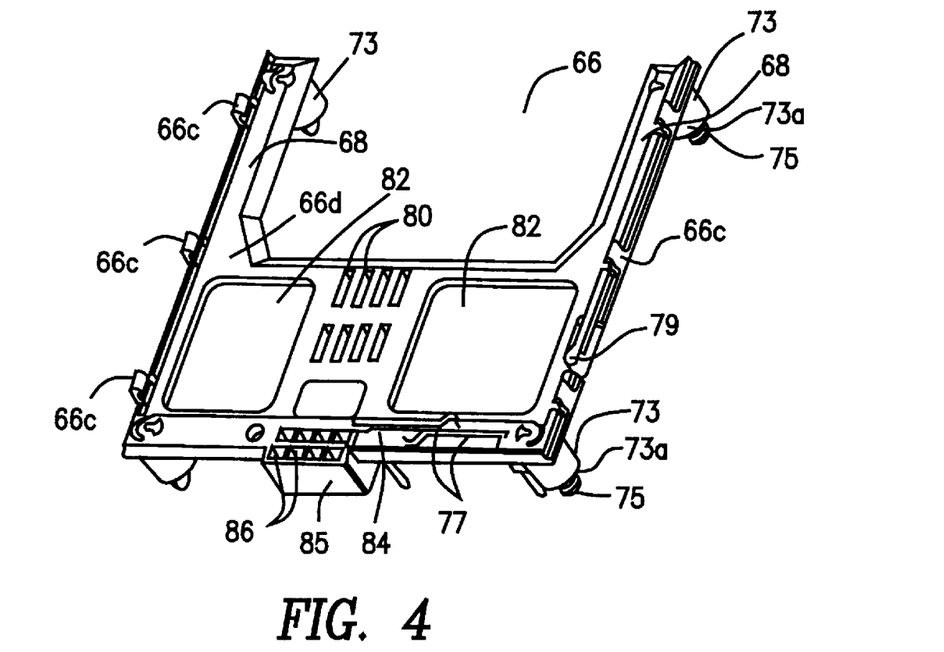
FIG. 4 is a top perspective view of a connector base of the smart card connector of FIGS. 3 and 3A.
Figure 4A:
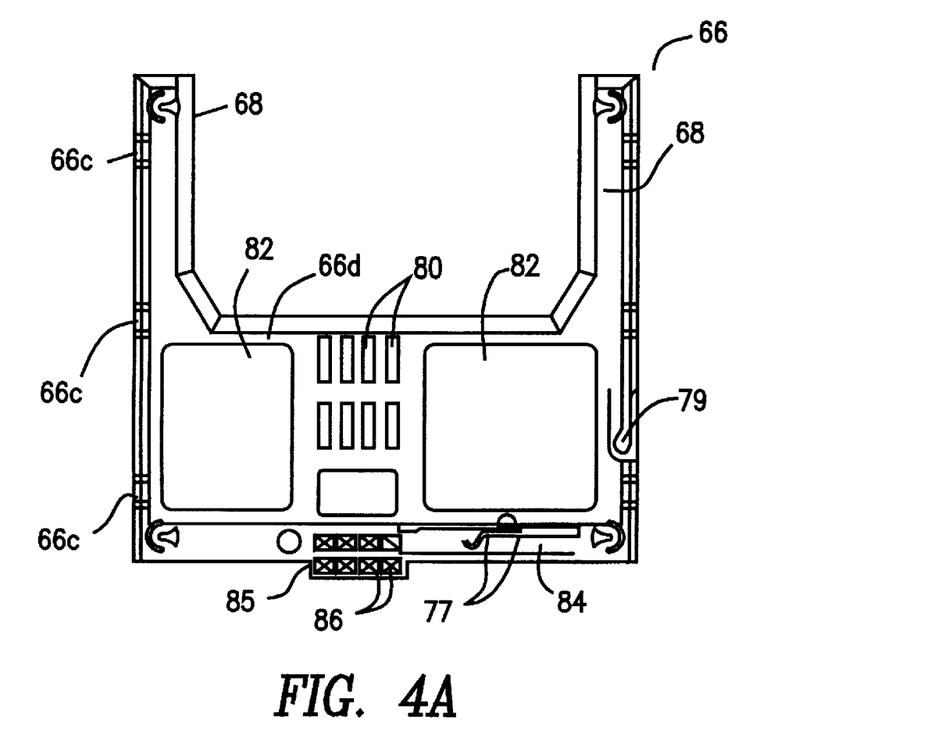
FIG. 4A is top view of the connector base of FIG. 4.

Further referring to FIGS. 4 and 4A, connector base 66 includes a pair of guide limbs 68 extending from a central guide member 66d. Each guide limb 68 includes an offset 73 protruding from an undersurface thereof, such offset having construction substantially similar to that of offset 43 shown in FIGS. 2 and 2A. Each offset 73 includes a substantially planar surface landing 73a defined at an extremity thereof from which a securement member 75 extends.

Base 66 is desirably molded so as to include a contact cell 84 having a plurality of passageways 86 therethrough. Passageways 86 accommodate insertion of corresponding contacts 41 inserted in connector 60 as further described hereinbelow. Cell 84 preferably has a height corresponding to the height of offsets 73 so as to sit flush adjacent a PCB or other support surface. Such a configuration conceals the contacts within an insulative housing, thereby protecting them from damage and debris and reducing the opportunity for short-circuiting.

Base 66 may further include one or more resilient retention fingers 79 integrally molded therewith. Finger 79, like finger 49 of connector 30, presses against an edge of a smart card inserted thereagainst to retain the orientation of the card within connector 60 during a card reading operation.

Base 66 is desirably molded to include a plurality of apertures 80 and 82 therein so as to conserve materials and thereby reduce the cost of connector manufacture. An aperture 84 is also desirably included in which one or more switching contacts 77 are positioned. Switching contacts 77 are shown herein as deflectable spring-like contacts in an opposing cantilever configuration. Switching contacts 77 are conventional contacts that initiate a card reading operation when a smart card edge is inserted thereagainst. The contacts may be disposed in a normally open configuration as shown herein such that a card reading operation begins upon engagement of the contacts' deflectable ends. Alternatively, the contacts may be disposed in a normally closed configuration wherein a card reading operation commences as soon as a smart card engages a contact most proximate thereto. As stated hereinbefore, the configuration and disposition of switching contacts 77 is well known in the art.

Figure 5:
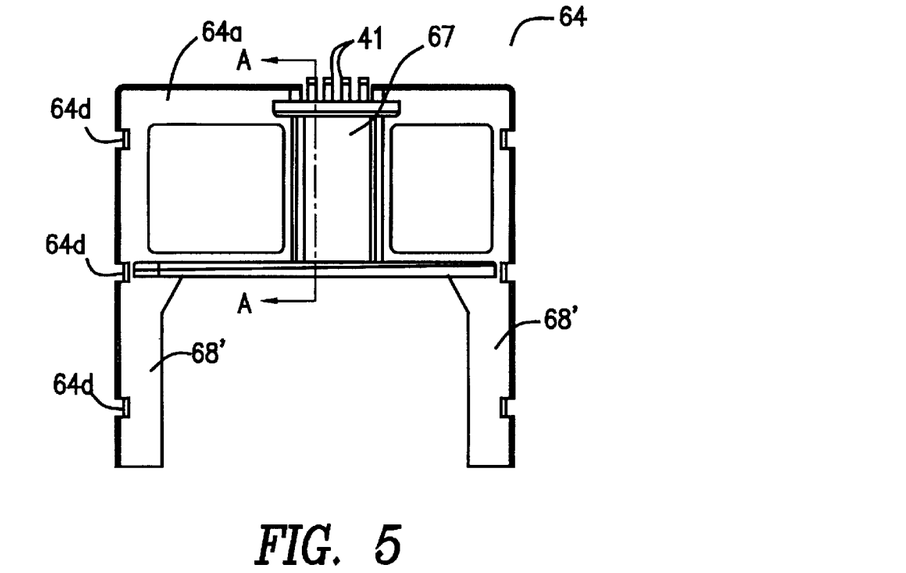
FIG. 5 is a top view of a connector lid of the smart card connector of FIGS. 3 and 3A.
Figure 5A:
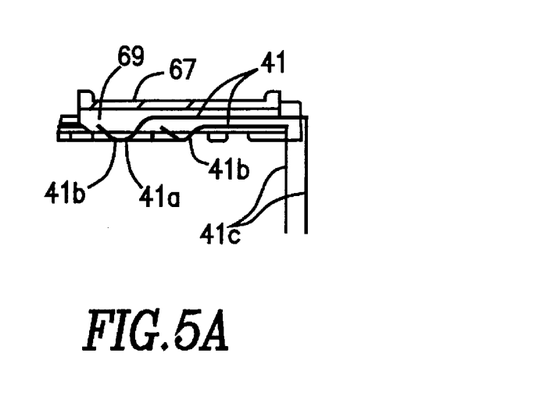
FIG. 5A is a cross-section of the connector of FIG. 5 taken along line A—A.
Figure 5B:
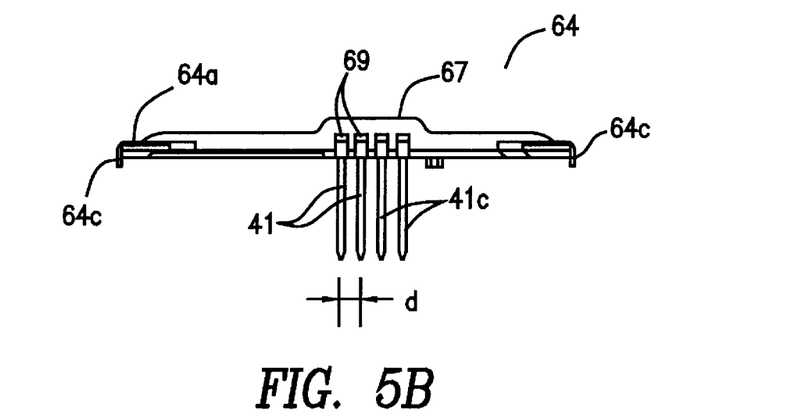
FIG. 5B is a rear view of the connector lid of FIG. 5 showing a plurality of electrical contacts extending therefrom.

As further illustrated in FIGS. 5, 5A and 5B, connector lid 64 is provided with guide arms 68' that correspond in length and width to guide arms 68 of connector base 66. Guide arms 68 and 68' together define card insertion rails 90 along which a smart card is guided until insertion of the card into slot 65. Rails 90 ensure proper linear sliding movement of the card during insertion or retraction thereof, yet also allow the user to easily view the card to determine if the contact pads of the card are in a proper card reading orientation relative to the connector.

Lid 64, like lid 34 of connector 30 shown in FIGS. 2 and 2A, provides a plurality of longitudinal recesses 69. As specifically shown in FIG. 5A, each recess 69 accommodates disposition of at least one contact 41 therein. Each contact 41 has a freely deflectable interior extent 41a as shown with a spring-like undulation 41b at an extremity thereof. Each contact 41 also includes an exterior extent 41b having a 90° bend relative to lid 64 for simple termination to the PCB. Contacts 41 are provided in an even, aligned distribution wherein each contact is separated from an adjacent contact by a predetermined distance d (shown in FIG. 5B). This distribution of the contacts in lid 34 easily accommodates all of the contacts in a single housing piece and ensures predictable engagement between the contacts and the contact pads of a smart card inserted in the connector.

In operation, connector 60 is attached to a PCB or other support surface by removably attaching securement members 75 to the PCB so that offset landings 73a are positioned directly thereadjacent. Offsets 73 thereby elevate connector 60 above the PCB by a height h' corresponding to the height of the offsets themselves. Additional electrical components can therefore be placed underneath the connector to accommodate plural functions for an electronic device within which the connector is installed. The connector thereby preserves valuable PCB space while ensuring a sufficient electrical connection during a card reading operation.

A smart card is inserted into connector 60 with a surface of the card defining the contact pads thereon facing upward toward interior contact extents 41a. Insertion of the card begins by aligning the card within rails 90 and pushing the card in a card insertion direction designated by arrow A. Rails 90 guide the card toward ingress 65 for introduction of the card along the card insertion plane into card insertion slot 65. The card continues sliding movement toward a rear portion of connector 60 such that interior contact extents 41a contact the surface of the card, and thus the contact pads thereon. Continued sliding movement of the card deflects undulations 41b upward into corresponding recesses 69 and they are retained therewithin for the duration of a card reading operation. Upon retraction of the card from slot 65, undulations 41b resiliently return to their original resting position within the card insertion plane. It is noted that sliding movement of the card during insertion may be limited by either or both of switching contacts 77 once the card comes into mechanical and electrical engagement with such contacts.

It is evident from the foregoing description that the present invention is useful for various applications wherein preservation of PCB space is allocated a high priority. The present invention does so without compromising valuable packaging areas or sacrificing sufficient electrical connection between the smart card and the PCB.

Various changes to the foregoing described and shown methods and corresponding structures would now be evident to those skilled in the art. The matter set forth in the foregoing description and accompanying drawings is therefore offered by way of illustration only and not as a limitation. Accordingly, the particularly disclosed scope of the invention is set forth in the following claims.

What is claimed is:

1. A connector for establishing electrical connection between at least one contact pad of an integrated circuit card and conductive elements of a printed circuit board, comprising:

a substantially planar connector housing supportable on said printed circuit board, said housing having a lid and a base wherein each of said lid and said base further includes an upper surface and a lower surface defining a thickness therebetween and wherein said lid and said base define a card insertion slot therebetween for insertably accommodating said integrated circuit card therein;

a plurality of electrical contacts supported by said lid wherein each contact includes an interior contact extent having a freely deflectable spring-like portion defined thereat, said interior contact extent provided for electrical engagement with said contact pad of said integrated circuit card, and an exterior contact extent for termination to said printed circuit board; and at least one normally extending offset members protruding from said base lower surface for elevating said connector above said printed circuit board so as to define a predetermined height therebetween;

wherein said lid includes a pair of longitudinally extending guide arms and said base includes a corresponding pair of longitudinal guide limbs extending from a central guide member such that said guide arms and said guide limbs together define card insertion rails along which said integrated circuit card is guided until insertion of said card into said slot.

2. The connector of claim 1 wherein said each said guide limb includes an offset protruding from an undersurface thereof.

3. The connector of claim 2 wherein said offset includes a generally planar surface landing defined at an extremity thereof.

4. The connector of claim 3 wherein a securement member extends from said landing.

5. The connector of claim 1 wherein each of said lid and said base are molded from an insulative plastic.

6. The connector of claim 1 wherein said lid includes side wall portions depending from said lid bottom surface.

7. The connector of claim 1 wherein said lid upper surface is bifurcated by a contact hangar having a plurality of longitudinal recesses therein.

8. The connector of claim 1 wherein said lid includes at least one receptacle defined therein for locking engagement with a corresponding latch.

9. The connector of claim 8 wherein said base includes at least one side latch depending normally from said base upper surface for interengagement with said receptacle.

10. The connector of claim 1 wherein said base includes at least one switching contact for indicating complete insertion of a smart card within said connector and further initiating a card reading operation.

11. The connector of claim 1 wherein said base further includes at least one retention finger formed integrally therewith to ensure alignment of said integrated circuit card in said connector.

12. The connector of claim 1 wherein said base includes a contact cell having a plurality of passageways defined therewithin to accommodate insertion of said exterior extent of said contacts therethrough.

13. The connector of claim 12 wherein said cell has a height corresponding to said height of said offset so as to sit flush adjacent said printed circuit board.

14. The connector of claim 1 wherein said contacts are supported in said lid in an even, aligned distribution such that each contact is separated from an adjacent contact by a predetermined distance.

* * * * *